Dec. 31, 1957 O. SEIFFERLE 2,818,102
SEGMENTAL EXPANDING PIPE DENT REMOVER
Filed July 11, 1955

INVENTOR.
OLIVER SEIFFERLE
BY
Buckhorn and Cheatham
ATTORNEYS

United States Patent Office 2,818,102
Patented Dec. 31, 1957

2,818,102

SEGMENTAL EXPANDING PIPE DENT REMOVER

Oliver Seifferle, Baker, Oreg.

Application July 11, 1955, Serial No. 521,146

6 Claims. (Cl. 153—80)

This invention relates to devices for removing dents from pipes and tubing, and in particular to such devices which are inserted into pipes or tubing. These devices are referred to in the trade as pipe dingers.

A main object of the present invention is to provide a device for removing dents from pipes that comprises few parts and is of simple and inexpensive construction.

A further object of the invention is to provide an expansible device of the class described which is so formed that it may be readily projected into the dented portion of a pipe, but is operable to remove entirely the dent and restore the pipe to its original round condition.

Another object of the present invention is to provide a pipe dent remover which when actuated is automatically operable to straighten accurately a dented portion of a pipe without requiring the operator to gauge the straightening operation.

Still another object is to provide a pipe dent remover having a clutch arrangement which may be engaged to enable an expansible head of the dent remover to be turned in a pipe readily to permit proper orientation of the head relative to a dent in a pipe, or may be disengaged to enable the expansible head to be expanded.

The device of the present invention is characterized by including an expansible head adapted to fit into a pipe and comprising a pair of generally semicylindrical body members held together by resilient means and separable by a mechanism which is operated by a shaft projecting rearwardly of the head. The head has a flattened configuration permitting it readily to be projected into a dented portion of a pipe, so that upon expansion of the head it straightens a substantial part of the dented portion. Associated with the shaft is a clutch which may be engaged, upon proper axial shifting movement of the shaft, to connect the shaft directly to the head to permit the head to be turned in a pipe, or may be disengaged to permit the head to be expanded.

Various other objects of the present invention will be apparent from the following description taken in connection with accompanying drawings wherein.

Figure 1:
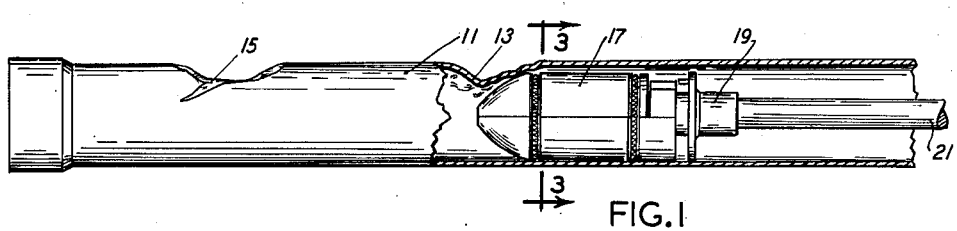
Fig. 1 shows a device of the present invention inserted into a dented pipe, the head being contracted.
Figure 2:
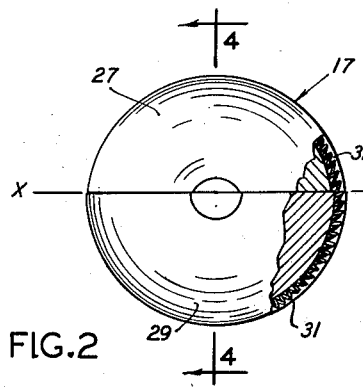
Fig. 2 is an enlarged front view of the device in its contracted condition.

Referring to the accompanying drawings, Fig. 1 shows a device of the present invention inserted in a pipe 11 which has two dented portions 13 and 15. The dent removing device includes a hollow head, generally indicated at 17, rearwardly from which projects a shaft 19 to which is connected a shaft extension 21. As is apparent from Figs. 1 and 4, the head 17 is generally bullet-shaped and, technically speaking, may be considered as having a generally cylindro-ogival or obus configuration.

The head 17 includes a pair of ogived or blunt nosed, substantially semicylindrical, body members 27 and 29, which are held in face to face contact along a matching longitudinal plane X—X by a pair of annular coil springs 31 surrounding the members. The springs are disposed in grooves 32 in the body members 27 and 29 so that the springs do not project beyond the exterior surface of the head.

The center of curvature of the surface of the body member 29 rearwardly of its nose is a longitudinal axis which is parallel to and may lie in plane X—X, as shown, so that such surface is a true semicylinder. However, the axis may be located beyond plane X—X, in which case such surface is a chordal segment of a semicylinder. The center of curvature of the surface of the body member 27 rearwardly of its nose is a longitudinal axis which is parallel to but spaced from the axis of member 29 in a direction beyond plane X—X. Thus this surface is a chordal segment of a semicylinder. The just mentioned curved surfaces have the same radius of curvature, which is slightly less than that of the interior of the pipe to be expanded to facilitate ready insertion of the head into the pipe. Inasmuch as at least one of the body members has a main curved surface which is a chordal segment of a semicylinder, the head, in its contracted condition, will have a thickness normal to plane X—X less than its thickness with said plane and thus have a flattened appearance.

Each of the body members is recessed on its matching face, and body member 29 is provided with a forward boss 39 and a rearward boss 41, which project beyond plane X—X and are bored to provide bearings for shaft 19, previously mentioned. The shaft has a front reduced portion 43 rotatably mounted in bearing 39 and grooved to receive a split washer 45. The rear main portion of the shaft 19 is of larger diameter than, and is coaxial with, the reduced portion 43 and is rotatably mounted in bearing 41. The bosses or bearings 39 and 41 also permit axial shifting movement of shaft 19, the split ring 45 limiting axial shifting movement to the right, as the parts are depicted in Fig. 4, and a flange 49 limiting axial shifting movement of the shaft toward the left, as the parts are depicted in Fig. 4.

The shaft 19 also includes an eccentric portion 51 which has a throw slightly greater than the distance between the axes of curvature of the body members 27 and 29 when the head is contracted. Rotatably mounted on the eccentric portion 51 is a pitman 53 which encircles the eccentric, as shown in Fig. 3, and has a projecting longitudinal rib portion 55 fitting within a longitudinal depression 57, formed in body member 27, and bearing against the floor or bottom of such depression.

A clutch is adapted to provide a driving connection between shaft 19 and body member 29 and includes a lug or finger 61 projecting from flange 49 toward a notch 63 formed in the free end of boss 41 in a position to receive the lug 61 when the lug is brought into circumferential alignment with the notch. As the parts are shown in Fig. 4, the lug and notch are out of engagement, and thus shaft 19 may be rotated relative to the body members 27 and 29.

Figure 4:
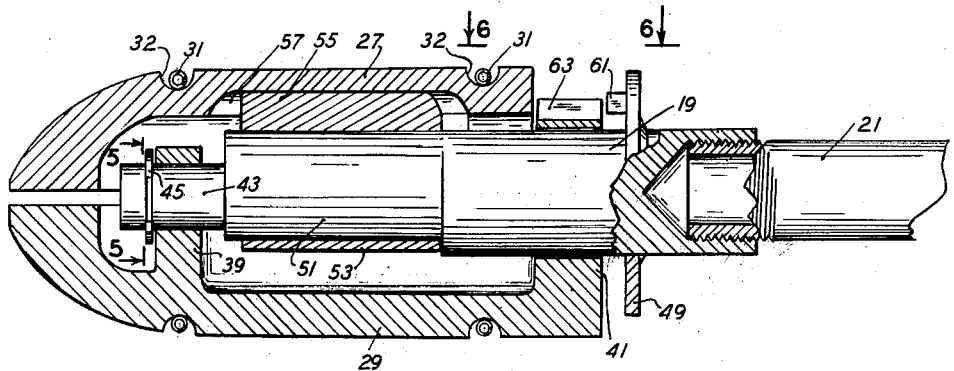
Fig. 4 is a longitudinal sectional view through the device taken along line 4—4 of Fig. 2, showing the head when expanded and the clutch disengaged.
Figure 6:
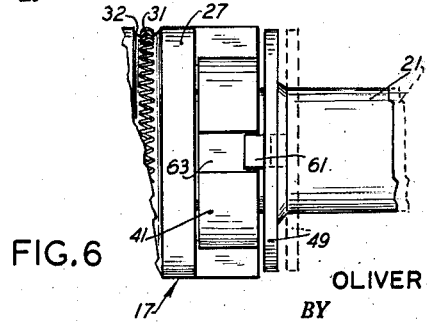
Fig. 6 is a fragmentary view taken in the direction of the arrows 6—6 in Fig. 4, showing the clutch engaged.

The shaft extension 21 preferably comprises a length of standard pipe externally threaded on its left-hand end, as the parts are depicted in Fig. 4, and threadedly received within the right-hand end of shaft 19 in a coaxial relation relative to the shaft.

Figure 3:
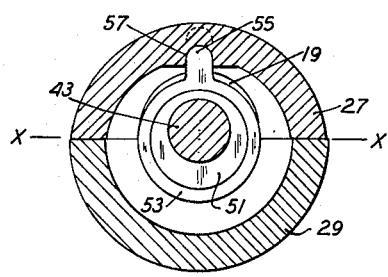
Fig. 3 is an enlarged sectional view through the head of the device taken along line 3—3 of Fig. 1.
Figure 5:
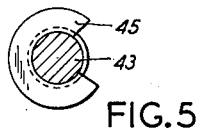
Fig. 5 is a sectional view taken along line 5—5 of Fig. 4.

As shown in Fig. 3, the axis of shaft 19 is disposed in slight spaced relation above plane X—X and is disposed in the longitudinal medial plane normal to plane X—X. The particular location of the shaft axis is of no great importance, but a generally coaxial disposition of the shaft relative to the head 17 is preferred. Since the head, when contracted, has a flattened appearance, plane X—X may be considered as the major longitudinal median plane of the head, and the longitudinal plane normal thereto and containing the axis of shaft 19 may be considered as the minor longitudinal median plane. Thus the bearings 39 and 41 may be considered as being generally concentric of the intersection of the minor and major longitudinal median plane of said head.

In operation, the head 17 is inserted into the pipe 11 with the clutch engaged. The head is oriented or turned in the pipe by turning extension 21 so that the head will expand in a direction approximately normal to the indented portion, thus to permit it to be inserted or rammed more fully into the space between the indented portion 13 and the opposite side of the pipe, and to facilitate pressing out of the indented portion when the head is expanded.

Now, the shaft extension 21 is withdrawn slightly, to disengage the clutch, and then turned to force the pitman 53 against body member 27 and move it away from body member 29 to expand head 17. As previously mentioned, the throw of the eccentric 51 is slightly greater than the spacing between the axes of curvature of the body members 27 and 29 when the head is contracted. Thus when the head 17 is expanded, the curved surfaces of body members 27 and 29 will press out and straighten at least a part of the indented portion and thus restore such part to its original round condition without requiring the operator to gauge the straightening operation. In instances where it is possible to insert the head 17 fully between an indented portion and the opposite side wall of the pipe, expansion of the head will function to press out and fully straighten the entire indented portion.

Having described the invention in what is considered to be the preferred embodiment thereof, it is desired that it be understood that the invention is not to be limited other than by the provisions of the following claims.

I claim:

1. An internal pipe dinger comprising a pair of substantially semicylindrical members having ogived forward ends, resilient means holding said members together to form a longitudinally split, obus-shaped assembly, bearing means on one of said members generally concentric to the intersection of the minor and major longitudinal median planes of said assembly, a shaft journaled in said bearing means and projecting rearwardly from said assembly, said shaft having an eccentric portion within said assembly, and a pitman mounted on said eccentric portion and bearing internally against the other of said members whereby rotation of said shaft relatively separates said members against the force of said resilient means.

2. A device for removing dents from a pipe comprising an elongated head of generally cylindro-ogival shape including a pair of blunt nosed, generally semicylindrical body members meeting along a longitudinal matching plane, resilient means holding said body members together, said head being of lesser diameter normal to said plane than with said plane enabling said head readily to enter a dented portion of a pipe, the blunt noses of said body members being at one end of said head, a shaft journalied in said head generally concentric therewith and extending from the other end of said head, and means actuated by rotation of said shaft relative to said head for separating said members against the force of said resilient means to straighten said dented pipe portions.

3. A device for removing dents from a pipe comprising a substantially bullet-shaped head including a pair of blunt nosed, generally semicylindrical body members meeting along a longitudinal matching plane, resilient means holding said body members together, said head being of lesser maximum diameter normal to said plane than with said plane enabling said head readily to enter a dented portion of a pipe, a shaft extending into said head and being mounted on said head for rotation about a longitudinal axis and for axial shifting movement, means within said head operable in response to rotation of said shaft relative to said head to separate said members, and clutch means on said shaft and at least one of said members engageable when said shaft is shifted in one direction and disengageable when said shaft is shifted in the opposite direction, whereby to permit said members optionally to be rotated or separated upon rotation of said shaft.

4. A device for removing dents from a pipe comprising a substantially bullet-shaped head including a pair of blunt nosed, generally semicylindrical body members meeting along a longitudinal matching plane, resilient means holding said body members together, said head rearwardly of its nose having a diameter along said plane slightly less than the interior diameter of the pipe to be operated on and a lesser diameter normal to said plane enabling said head readily to be projected into a dented portion of a pipe, a shaft rotatively mounted in said head and extending from the rearward end of said head and means actuated by rotation of said shaft relative to said head for separating said members an extent such that said head portion rearwardly of the nose is of greater diameter normal to said plane than with said plane thereby to straighten said dented portion of said pipe and restore said pipe to its original round condition.

5. A device for removing dents from pipes comprising a hollow elongated head of generally cylindro-ogival shape for fitting into a pipe, said head including a pair of blunt nosed generally semicylindrical body members meeting along a longitudinal matching plane, resilient means holding said body members together, the curved surface of one member rearwardly of its nose having as its center of curvature a first longitudinal axis, the curved surface of the other member rearwardly of its nose having as its center of curvature a second longitudinal axis parallel to said first axis but displaced therefrom, said curved surfaces having equal radii of curvature, a shaft journaled in said one member for rotation about a longitudinal axis, said shaft having an eccentric portion disposed within said assembly, said eccentric portion having a throw greater than the distance between said axes, and a pitman mounted on said eccentric portion and bearing internally against said other member, whereby rotation of said shaft relatively separates said members against the force of said resilient means to bring said axes into and beyond coincidence.

6. A device for removing dents from pipes comprising a hollow elongated head of generally cylindro-ogival shape for fitting into a pipe, said head including a pair of blunt nosed generally semicylindrical body members meeting along a longitudinal matching plane, resilient means holding said body members together, the curved surface of one member rearwardly of its nose having as its center of curvature a first longitudinal axis, the curved surface of the other member rearwardly of its nose having as its center of curvature a second longitudinal axis parallel to said first axis but displaced therefrom, said curved surfaces having equal radii of curvature, a shaft journaled in said one member for rotation about a longitudinal axis and for axial sliding movement, said shaft having an eccentric portion disposed within said assembly, said eccentric portion having a throw greater than the distance between said axes, a pitman mounted on said eccentric portion and bearing internally against said other member whereby rotation of said shaft relatively separates said members against the forces of said resilient means to bring said axes into and beyond coincidence, and cooperative clutch means on said one member and said shaft for providing a driving connection therebetween when said shaft is axially shifted in one direction and for releasing said connection when said shaft is axially shifted in the opposite direction whereby to permit said members optionally to be rotated or separated upon rotation of said shaft.

References Cited in the file of this patent

UNITED STATES PATENTS

| | | |
|---|---|---|
| 1,157,073 | Baash | Oct. 19, 1915 |
| 1,544,510 | Ware | June 30, 1925 |
| 2,085,057 | Williams | June 29, 1937 |
| 2,627,773 | Barnett | Feb. 10, 1953 |